United States Patent [19]
Genrikh et al.

[11] 4,135,221
[45] Jan. 16, 1979

[54] ICE MELTING CIRCUIT ARRANGEMENT FOR A HIGH-VOLTAGE TRANSMISSION NETWORK

[75] Inventors: Georgy A. Genrikh; Leonid A. Nikonets; Lev S. Dostman; Vsevolod T. Korenev, all of Lvov, U.S.S.R.

[73] Assignee: Lvovsky Politekhnichesky Institut, Lvov, U.S.S.R.

[21] Appl. No.: 751,525

[22] Filed: Dec. 16, 1976

[51] Int. Cl.$^2$ .................................. H02H 1/00
[52] U.S. Cl. ................................. 361/1; 307/147; 219/209
[58] Field of Search .............. 361/107, 1, 62; 307/147; 219/209

[56] References Cited
U.S. PATENT DOCUMENTS 2,081,803  5/1937  Ell ........................................ 307/147
2,662,156  12/1953  Potter .................................. 219/209
2,870,311  1/1959  Greenfield et al. ............ 219/209 X

FOREIGN PATENT DOCUMENTS 1666722  7/1971  U.S.S.R. ................................. 307/147
1812420  7/1972  U.S.S.R. ................................. 307/147

Primary Examiner—Patrick R. Salce
Attorney, Agent, or Firm—Lackenbach, Lilling & Siegel

[57] ABSTRACT

A high-voltage network includes at least one overhead power transmission line provided with an insulated conductor, which line connects busbars of transmitting and receiving substations. A source for melting the ice is connected, in the course of ice melting, to at least one disconnected phase of the power transmission line. The insulated conductor is joined during ice melting to at least one disconnected phase of the overhead power transmission line from its opposite ends.

17 Claims, 50 Drawing Figures

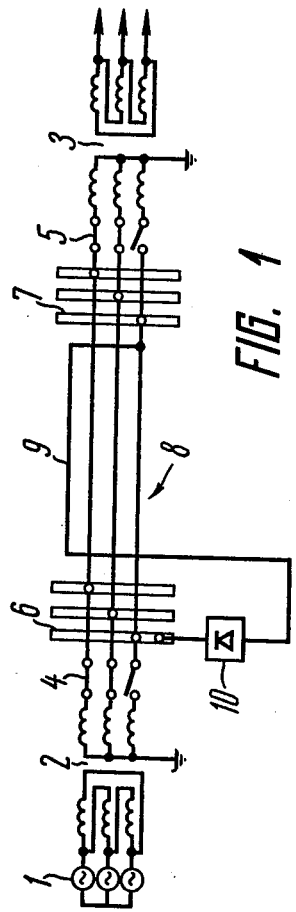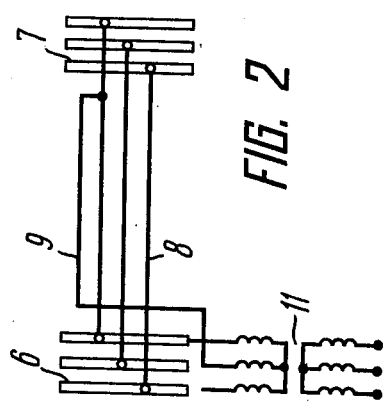

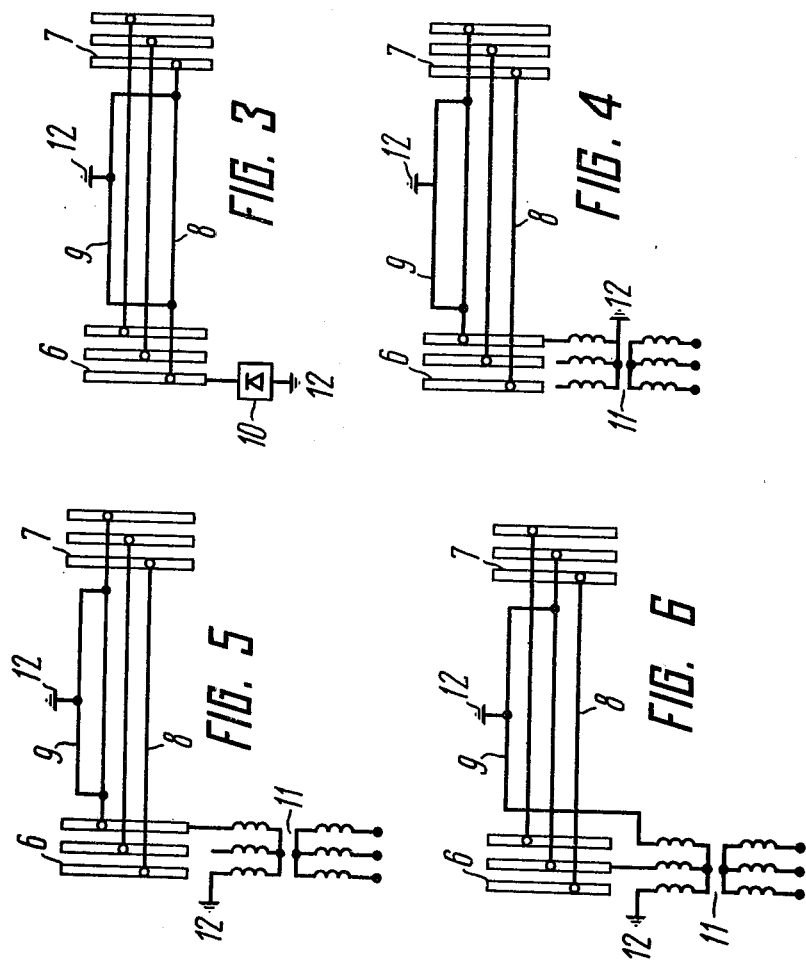

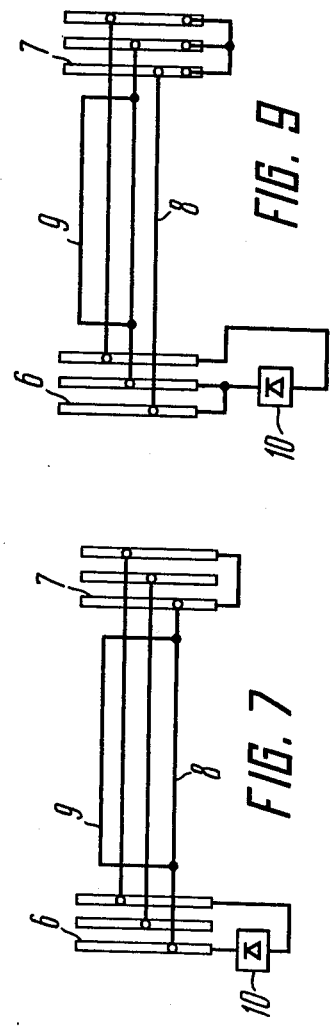

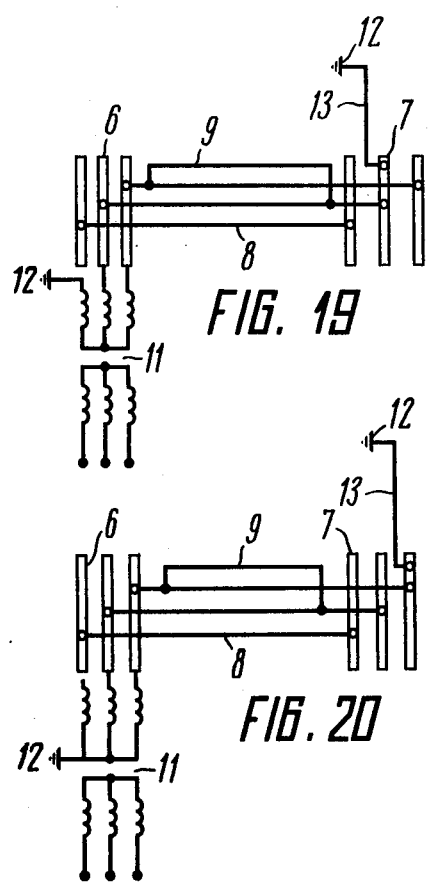

ICE MELTING CIRCUIT ARRANGEMENT FOR A HIGH-VOLTAGE TRANSMISSION NETWORK

FIELD OF THE INVENTION

The invention relates to power engineering and, in particular, to a high-voltage network.

The proposed high-voltage network can be employed in areas of severe ice.

DESCRIPTION OF THE PRIOR ART

There is known a high-voltage network comprising an overhead power transmission line provided with an insulated conductor, which connects the supply (transmitting) and intermediate (receiving) substations, and a source for melting the ice connected to the heated conductor.

In this case melting of the ice on conductors of all lines of said high-voltage network requires sources for melting the ice at each substation, which ensure a specified voltage level and are connected to the conductor.

In some cases the available nominal operating voltage at the substation does not correspond to the required voltage for melting the ice on a given conductor, which makes melting difficult.

When, at one of the substations there is no source for melting the ice, the icing on the conductor of the overhead line is melted from its opposite end, which involves increased insulation of the conductor.

Besides, in some cases making the circuit for melting the ice on the conductor from a voltage source with a specified voltage value requires a great number of switchings and presence of duty personnel at each substation.

SUMMARY OF THE INVENTION

It is an object of this invention to provide a high-voltage network which ensures heating of insulated conductors with less insulation.

Another object of this invention is to considerably reduce the number of sources for melting the ice.

Yet another object of this invention is to reduce the time for joining the power transmission line circuit for melting the ice.

These objects are achieved by a high-voltage network comprising at least one overhead power transmission line provided with an insulated conductor, said line connecting busbars of the receiving and transmitting substations. A source for melting the ice is provided which is coupled during ice melting to at least one disconnected phase of the power transmission line. The insulated conductor, according to the invention, is coupled during ice melting to at least one disconnected phase of the overhead power transmission line from its opposite ends.

It is preferable that a high-voltage network comprise an overhead power transmission line with an insulated conductor, which connects busbars of the transmitting and receiving substations and a source for melting the ice, which one output of which being connected during ice melting to one end of the insulated conductor, according to the invention and the other output of the source for melting the ice being connected from the opposite ends of the overhead power transmission line to at least one disconnected phase of the overhead power transmission line.

It is also advisable preferable that a high-voltage network comprise an overhead power transmission line with an insulated conductor, said line connecting busbars of the transmitting and receiving substations and a source for melting the ice, one output being connected during ice melting to one end of the insulated conductor and the other output of which being grounded. According to the invention, said output of the source for melting the ice is connected to one end of the insulated conductor and the other end of said insulated conductor is coupled from the opposite ends of the overhead power transmission line to at least one disconnected phase of the overhead power transmission line. The insulated conductor is grounded on the run between the busbars of the transmitting and receiving substations.

It is preferable that a high-voltage network comprise a three-phase source as a source for melting the ice, one output of which is connected to one end of the insulated conductor. According to the invention, the other output of the three-phase source for melting the ice and the insulated conductor is grounded, the insulated conductor being grounded between the transmitting and receiving substations.

In a high-voltage network at least one other phase of the power transmission line can be connected parallel to the insulated conductor during ice melting, according to the invention.

It is possible that a high-voltage network comprise a three-phase source as a source for melting the ice, one output of which is connected to one end of the conductor. According to the invention, the insulated conductor and the neutral conductor of the three-phase source for melting the ice are grounded, the insulated conductor being grounded on the run between the transmitting and receiving substations.

It is also possible that a high-voltage network comprise a three-phase source with three outputs as a source for melting the ice. According to the invention, all three outputs of the three-phase source for melting the ice are connected from one end of different phases of the overhead power transmission line, said phases being shorted out at the other end of the line.

There can be employed a high-voltage network comprising at least one additional overhead power transmission line leading from the busbars of the receiving substation and provided with an insulated conductor, its one end being grounded, according to the invention, either the other end of the insulated conductor of the additional overhead power transmission line is coupled during ice melting to at least one disconnected phase of the overhead power transmission line, or one output of the source for melting the ice is grounded during ice melting and the other end of the insulated conductor of the additional overhead power transmission line is coupled to at least one disconnected phase of the overhead power transmission line.

It is possible to employ a high-voltage network comprising a three-phase source as a source for melting the ice, two outputs of which are connected during ice melting to the end of the insulated conductor of the overhead power transmission line; and at least one additional overhead power transmission line leading from the busbars of the receiving substation and provided with another insulated conductor, its one end being grounded. According to the invention, the third output of the three-phase source for melting the ice is grounded and the other end of the insulated conductor of the additional overhead power transmission line is coupled during ice melting to at least one disconnected phase of the overhead power transmission line.

It is also preferable that a high-voltage network comprise a three-phase source, two outputs of which are connected during ice melting to two phases of the overhead power transmission line, which are connected to the ends of the insulated conductor; and an additional overhead power transmission line leading from the busbars of the receiving substation and provided with another insulated conductor, its one end being grounded. According to the invention, either the other end of the insulated conductor of the additional overhead power transmission line is coupled during ice melting to at least one disconnected phase of the overhead power transmission line and the neutral conductor of the three-phase source for melting the ice is grounded or the other end of the insulated conductor of the additional overhead power transmission line is coupled during ice melting to at least one disconnected phase of the overhead power transmission line, the third output of the three-phase source for melting the ice being grounded.

It is expedient that a high-voltage network comprise an additional overhead power transmission line leading from the busbars of the receiving substation and provided with an insulated conductor. According to the invention, the ends of the insulated conductor of the additional overhead power transmission line are coupled during ice melting to one disconnected phase of this line and the insulated conductor is grounded between the receiving substations of the main and additional overhead power transmission lines or at the receiving substation of the additional power transmission line.

It is preferable that a high-voltage network comprise a three-phase source as a source for melting the ice and an additional line leading from the busbars of the main receiving substation and provided with an insulated conductor. One end of the disconnected phase of the additional power transmission line is, according to the invention, coupled to the disconnected phase of the main line and the other end is coupled to the end of the insulated conductor at the receiving substation of the additional power transmission line, the other end of the insulated conductor of said line being connected to two phases of the main line, which are shorted out to each other at the receiving substation of the main line.

It is also preferable that a high-voltage network comprise an additional power transmission line leading from the busbars of the receiving substation and provided with an insulated conductor. According to the invention, the insulated conductor of the main line is coupled during ice melting to at least one disconnected phase through the additional line and its conductor.

It is expedient that a high-voltage network comprise at least one additional line leading from sectionalized busbars of the receiving substation of the main line and provided with an insulated conductor. The ends of the insulated conductor of the additional power transmission line are coupled, according to the invention, during ice melting to one of the disconnected phases of said line and the insulated conductor is grounded between the receiving substations of the main and additional power transmission lines or at the receiving substation of the additional line.

There can be employed a high-voltage network comprising another additional overhead power transmission line leading from the sectionalized busbars of the additional substation and provided with an insulated conductor, one end of which being grounded, and the other end of which being, according to the invention, coupled during ice melting to at least one disconnected phase of the additional overhead power transmission line, which leads from the busbars of the additional substation.

It is preferable that, to automate the assembly of the circuitry of a high-voltage network for melting the ice, the insulated conductors of the network be coupled to a disconnected conductor of the line through a series-connected short circuiter and a separator controlled by voltage sensors registering appearance and disappearance of a specified voltage.

The proposed high-voltage network, wherein the ice on insulated conductors is melted by means of the above described circuits, permits, according to the invention, a considerable reduction of the number of sources for melting the icing as compared to existing circuits, a shorter time for making a circuit for ice melting and for melting itself, and a reduction of conductor insulation or, when the insulation is not changed, a considerable increase of the length of heated portions of the conductor by raising the voltage of the sources for melting the ice.

BRIEF DESCRIPTION OF THE DRAWINGS

The principle of this invention will be better understood from the following description with reference to specific embodiments of circuits of a high-voltage network made for the period of ice melting taken in conjunction with the accompanying drawings, wherein:

FIG. 1 shows a high-voltage network with a DC source for melting the ice, one output of which is connected to the end of the insulated conductor and the other output of which is coupled to a disconnected phase of the overhead power transmission line to which the other end of the insulated conductor is joined from the opposite end of the power transmission line;

FIG. 2 shows a high-voltage network comprising a three-phase source for melting the ice, wherein the conductor is coupled at one end to one output of the source and by the other end to the end of a disconnected phase of the line the beginning of which is joined to the other output of the source for ice melting;

FIG. 3 shows a high-voltage network comprising a DC source for melting the ice, one output of which is grounded; and an insulated conductor coupled by its ends to a disconnected phase of the line and grounded between the receiving and transmitting substations, the disconnected phase of the line being coupled to the other output of the source for ice melting;

FIG. 4 shows a high-voltage network including a three-phase source for melting the ice, the neutral conductor is grounded and one output of which is coupled to a disconnected phase of the overhead line, the insulated conductor being connected parallel to said phase and grounded between the receiving and transmitting substations;

FIG. 5 shows a high-voltage network including a three-phase source for melting the ice, of which the neutral conductor of which is insulated, one output of which is grounded and the other output of which is coupled to a disconnected phase of the overhead line, the insulated conductor being connected parallel to said phase and grounded between the receiving and transmitting substations;

FIG. 6 shows a high-voltage network including a three-phase source for melting the ice, the neutral conductor of which is insulated, one output of which is grounded, and an other output of which is coupled to a disconnected phase of the overhead line, the insulated conductor being connected to said phase by its end and to the third output of the source by its other end and grounded between the receiving and transmitting substations;

FIG. 7 shows a high-voltage network, wherein a DC source for melting the ice is coupled by its two outputs to the beginnings of disconnected phases of the overhead line provided with an insulated conductor connected parallel to said phases which are shorted out at the receiving substation;

FIG. 8 shows a high-voltage network comprising a three-phase source for melting the ice with an insulated neutral conductor and an overhead line with an insulated conductor, two outputs of the source being coupled to two disconnected phases of the line, their other ends being shorted out to each other at the receiving substation, and the insulated conductor being connected parallel to said phases;

FIG. 9 shows a high-voltage network with a DC source for melting the ice, two outputs of which are connected to phases of the overhead line with an insulated conductor connected parallel to said phases, which are shorted out to each other at the receiving substation;

FIG. 10 shows a high-voltage network with a three-phase source for melting the ice with a grounded neutral conductor and an overhead line with an insulated conductor, wherein two outputs of said source are coupled to the end of the insulated conductor and a disconnected phase, the conductor being grounded between the receiving and transmitting substations;

FIGS. 18 and 19 show embodiments of a high-voltage network comprising a three-phase source for melting the ice with an insulated neutral conductor and one grounded output, and an additional overhead line with an insulated conductor, wherein the conductor of the additional line is coupled to a disconnected phase of the main line from one end and grounded from the other end;

FIG. 20 shows a high-voltage network comprising a three-phase source for melting the ice with a grounded neutral conductor and an additional line with an insulated conductor, wherein the conductor of the additional line is coupled to a disconnected phase of the main line from one end and grounded from the other end;

DETAILED DESCRIPTION OF THE INVENTION

Figure 11:
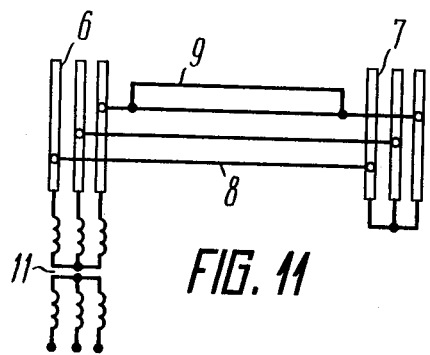
FIG. 11 shows a high-voltage network with a three-phase source for melting the ice with an insulated neutral conductor and an overhead line with an insulated conductor, wherein three outputs of the source are coupled to the ends of three disconnected phases of the line, their other ends being shorted out at the receiving substation, and the conductor being connected parallel to any phase of the line.

Referring to FIG. 1 an embodiment of a high-voltage network comprises a supply source 1, transformers 2 and 3 connected by means of switching apparatuses 4 and 5 to busbars 6 of the transmitting substation and busbars 7 of the receiving substation, an overhead line 8 provided with an insulated conductor 9, and a source for melting the ice fed from the low voltage busbars (not shown in FIG. 1) of the transmitting substation.

A converter 10 for converting alternating current into direct current (further referred to as the DC source 10 for melting the ice) is used as a source for melting the ice. Its one output is connected at the side of the transmitting substation to a disconnected phase of the overhead line 8 and the other output is connected to the insulated conductor 9. The second end of said conductor 9 is coupled to a disconnected phase of the overhead line 8 at the receiving substation.

Referring to FIG. 2, an embodiment similar to that of FIG. 1 employs a three-phase transformer 11 with an insulated neutral wire and two operating outputs as a source for melting the ice. One of said two outputs is coupled at the side of the transmitting substation to a disconnected phase of the overhead line 8 and at the other side to the end of the insulated conductor 9, the other end of the conductor 9 being coupled to a disconnected phase of the overhead line 8 at the receiving substation.

A high-voltage network of FIG. 3 comprises a DC source 10 for melting the ice, one output of which is connected to a ground 12 and the second output of which is connected to the beginning of the insulated conductor 9 and a disconnected phase of the overhead line 8 joined together. The second end of said conductor 9 is coupled to a disconnected phase of the line 8 at the receiving substation, the conductor 9 being connected to the ground 12 between the busbars 6 of the transmitting substation and the busbars 7 of the receiving substation.

The embodiments of the high-voltage networks of FIGS. 4 and 5 are similar to that of FIG. 3. The source for melting the ice is in one case a three-phase transformer 11 (FIG. 4) with a neutral wire connected to the ground 12 and one operating output connected to the beginning of the insulated conductor 9 and a disconnected phase of the overhead line 8 joined together. In the other case, it is also a three-phase transformer 11 (FIG. 5) with one output connected to the ground 12 and the other output connected to the beginning of the insulated conductor 9 and a disconnected phase of the overhead line 8 joined together.

Referring to FIG. 6, a high-voltage network comprises a three-phase transformer 11 as a source for melting the ice, one output being coupled to a disconnected phase of the overhead line 8, the second output being coupled to the end of the insulated conductor 9 grounded between the transmitting and receiving substations and coupled by its other end to a disconnected phase of the overhead line 8 at the receiving substation, and the third output being connected to the ground 12.

FIGS. 7, 8 and 9 illustrate embodiments of a high-voltage network, wherein at least one other phase of the overhead power transmission line 8 is connected in parallel with the insulated conductor 9 during ice melting.

When a DC source 10 for melting the ice (FIG. 7) is employed in a high-voltage network, its two outputs are coupled through the busbars 6 to the ends of two disconnected phases of the line 8, the two other ends of the disconnected phases of the line 8 being joined together and connected to the end of the insulated conductor 9 at the receiving substation. The beginning of said conductor 9 is coupled to a disconnected phase at the transmitting substation.

When the three-phase transformer 11 (FIG. 8) for melting the ice with an insulated neutral conductor is employed, its two outputs are connected to the busbars 6 of the transmitting substation, the circuit being similar to that of FIG. 7 in all other respects.

FIG. 9 illustrates a high-voltage network, wherein a disconnected phase of the line 8 is coupled in parallel with one more phase of the line 8 besides being coupled to the insulated conductor 9.

A high-voltage network of FIG. 10 comprises a three-phase transformer 11 for melting the ice, one output of which is coupled to one end of the insulated conductor 9, another output of which is coupled to a disconnected phase of the overhead line 8, and the neutral conductor of which being connected to the ground 12. The insulated conductor 9 is grounded between the transmitting and receiving substations.

FIG. 11 illustrates a high-voltage network wherein all three outputs of the three-phase source 11 for melting the ice are connected to different phases of the overhead line 8 at one end of said line 8, the other ends being shorted out and the insulated conductor 9 being connected in parallel with any phase of the line 8.

Referring to FIGS. 12–20, embodiments of a high-voltage network comprise an additional overhead power transmission line leading from the busbars 7 of the receiving substation of the overhead line 8 and provided with an insulated conductor 13, which one of which is connected to the ground 12 and the other end of which is coupled during ice melting to at least one disconnected phase of the main overhead power transmission line 8.

Figure 12:
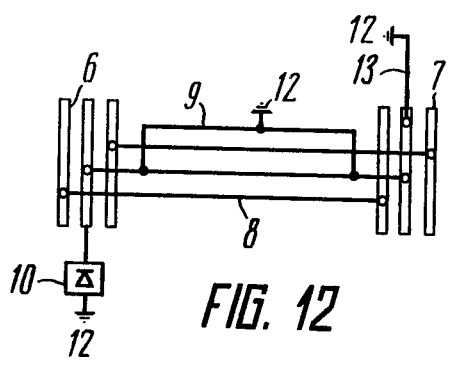
FIG. 12 shows a high-voltage network comprising a DC source for melting the ice with one grounded output and an additional line with an insulated conductor, wherein the conductor of the additional line is connected to a disconnected phase of the main line from one end and grounded from the other end.

Referring to FIG. 12, an embodiment of a high-voltage network has an additional overhead line provided with the insulated conductor 13, the DC source 10 for melting the ice and the insulated conductor 9 of the main overhead line 8 being connected during ice melting in a circuit similar to that of FIG. 3.

Figure 13:
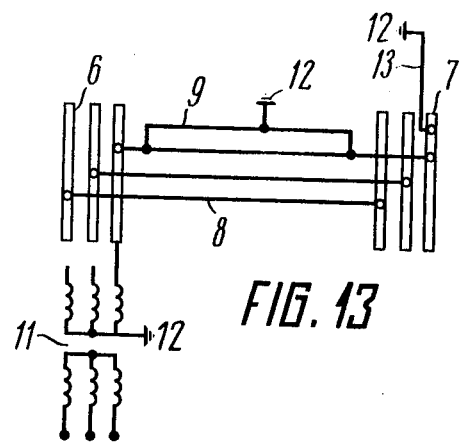
FIG. 13 shows a high-voltage network comprising a three-phase source for melting the ice with a grounded neutral conductor and an additional overhead line with an insulated conductor, wherein the insulated conductor of the additional line is coupled to a disconnected phase of the main line from one end and grounded from the other end.

FIG. 13 illustrates an embodiment of a high-voltage network with an additional overhead line provided with the insulated conductor 13, wherein the three-phase transformer 11 for melting the ice and the insulated conductor 9 of the main overhead line 8 are connected during ice melting as in the circuit of FIG. 4.

Figure 14:
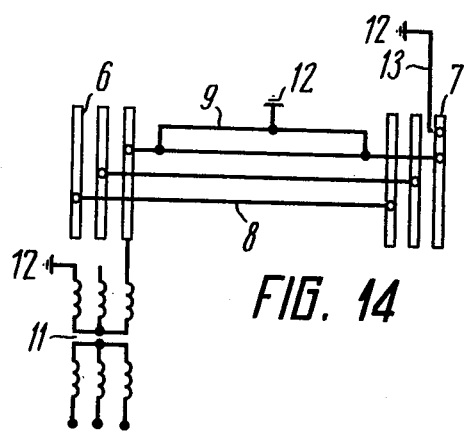
FIGS. 14 and 15 show embodiments of a high-voltage network comprising a three-phase source for melting the ice, with an insulated neutral conductor and one grounded output, and an additional line with an insulated conductor, wherein the conductor of the additional line is coupled to a disconnected phase of the main line from one end and grounded from the other end.

FIG. 14 illustrates an embodiment of a high-voltage network with an additional overhead line provided with the insulated conductor 13, wherein the three-phase transformer 11 for melting the ice and the insulated conductor 9 of the main overhead line 8 are connected during ice melting as in the circuit of FIG. 5.

Figure 15:
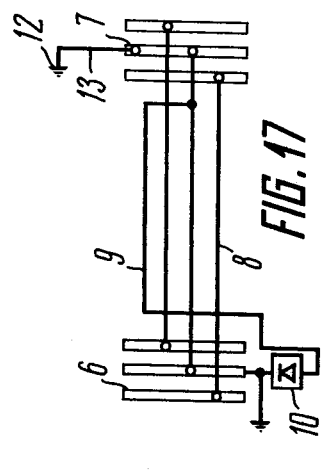

FIG. 15 illustrates an embodiment of a high-voltage network with an additional overhead line provided with the insulated conductor 13, wherein the three-phase transformer 11 and the insulated conductor 9 of the main overhead line 8 are connected during ice melting as in the circuit of FIG. 6.

Figure 16:
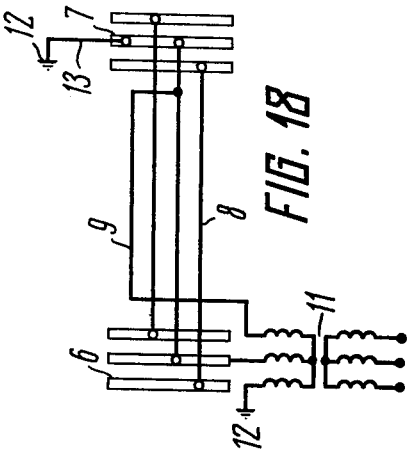
FIG. 16 shows a high-voltage network comprising a three-phase source for melting the ice with a grounded neutral conductor and an additional line with an insulated conductor, wherein the conductor of the additional line is coupled to a disconnected phase of the main line from one end and grounded from the other end.

FIG. 16 illustrates an embodiment of a high-voltage network with an additional overhead line provided with the insulated conductor 13, wherein the three-phase transformer 11 for melting the ice and the insulated conductor 9 of the main overhead line 8 are connected during ice melting in a circuit similar to that of FIG. 10.

Figure 17:
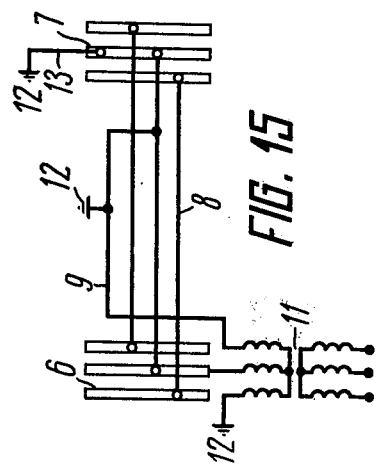
FIG. 17 shows a high-voltage network comprising a DC source for melting the ice with a grounded output and an additional line with an insulated conductor, wherein the conductor of the additional line is connected to a disconnected phase of the main line from one end and grounded from the other end.

FIG. 17 illustrates an embodiment of a high-voltage network with an additional overhead line provided with the insulated conductor 13, wherein the DC source 10 for melting the ice and the insulated conductor 9 of the main overhead line 8 are connected during ice melting as in a circuit shown in FIG. 1, but one output of the source 10 being connected to the ground 12.

Figure 18:
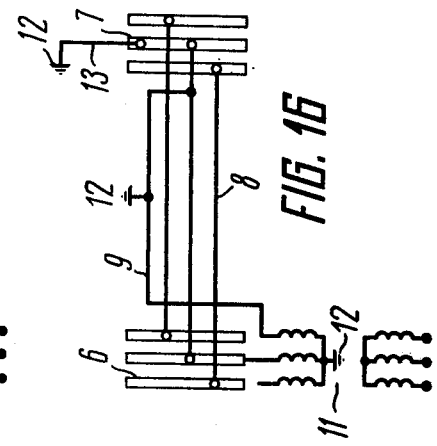

FIG. 18 illustrates an embodiment of a high-voltage network with an additional overhead line provided with the insulated conductor 13, wherein the three-phase transformer 11 for melting the ice and the insulated conductor 9 are connected during ice melting in a circuit similar to that of FIG. 2, but one output of the transformer 11 being connected to the ground 12.

FIGS. 19 and 20 illustrate embodiments of a high-voltage network with an additional overhead line provided with the insulated conductor 13, wherein the three-phase transformer 11 for melting the ice and the insulated conductor 9 of the main line 8 are connected during ice melting in a circuit similar to that of FIG. 2, but the grounding circuit 12 being in one case connected to one of the outputs of the transformer 11 (FIG. 19) and in the other case to the neutral conductor of said transformer 11 (FIG. 20).

Referring to FIGS. 21–38, embodiments of a high-voltage network comprise at least one additional overhead power transmission line (one line 15 in the described examples) leading from the busbars 7 of the receiving substation of the main overhead power transmission line 8 and provided with an insulated conductor 16, whose ends are coupled during ice melting to one disconnected phase of the additional line 15. The insulated conductor 16 is connected to the ground 12 between the receiving substations of the main line 8 and the additional line 15 (FIGS. 21–25, 31–34) or at the receiving substation of the additional power transmission line 15 (FIGS. 26–30, 35–38).

Figure 21:
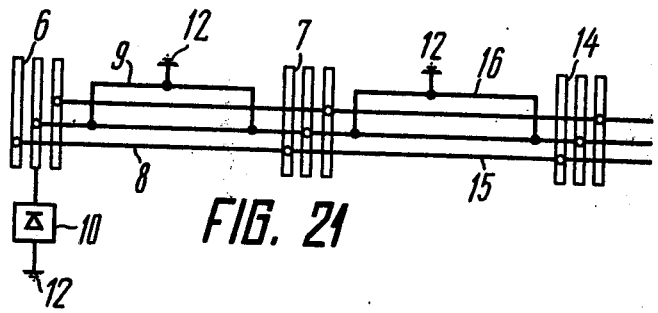
FIG. 21 shows a high-voltage network wherein a DC source for melting the ice with one grounded output is used and the insulated conductor of the additional overhead line is coupled parallel to a disconnected phase of the additional overhead line and grounded between the receiving substations of the main and additional lines.

Referring to FIG. 21 the DC source for melting the ice and the insulated conductor 9 of the main overhead power transmission line 8 are connected during ice melting in a circuit similar to that of FIG. 3.

Referring to FIGS. 22, 23, 24 and 25 the three-phase transformer 11 for melting the ice and the insulated conductor 9 of the main overhead power transmission line 8 are connected during ice melting as in the circuits shown in FIGS. 4, 5, 6 and 10, respectively.

Referring to FIGS. 27, 28, 29, 30, the three-phase transformer 11 for melting the ice and the insulated conductor 9 of the main overhead power transmission line 8 are connected during ice melting as in the respective circuits of FIGS. 4, 5, 6 and 10.

Figure 31:
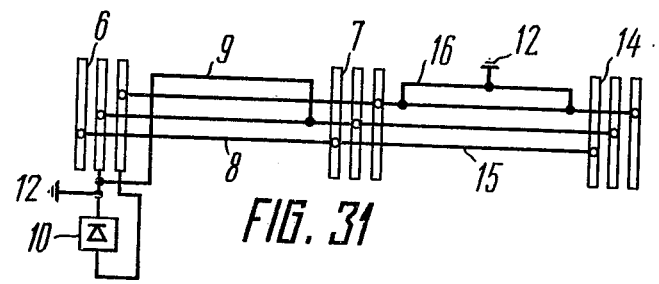
FIG. 31 shows a high-voltage network comprising a DC source for melting the ice with a grounded output and an additional overhead line, the insulated conductor of which being coupled in parallel with a disconnected phase of the additional line and being grounded between the receiving substations of the main and additional lines.

Referring to FIG. 31, the DC source 10 for melting the ice and the insulated conductor 9 of the main overhead line 8 are connected during ice melting as in the circuit of FIG. 17.

Figure 32:
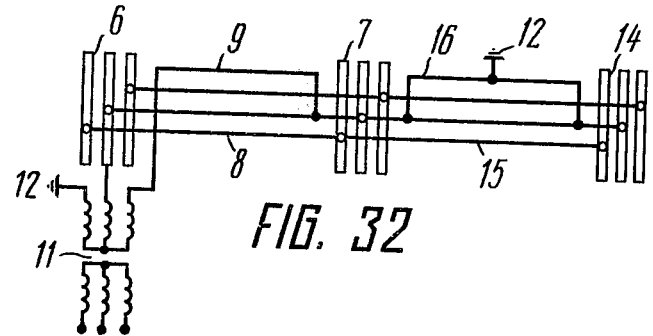
FIG. 32 shows a high-voltage network comprising a three-phase source for melting the ice with a grounded neutral conductor, one grounded output and two other operating outputs and an additional overhead line, the insulated conductor of which being coupled to a disconnected phase of the additional line and grounded between the receiving substations of the main and additional lines.
Figure 33:
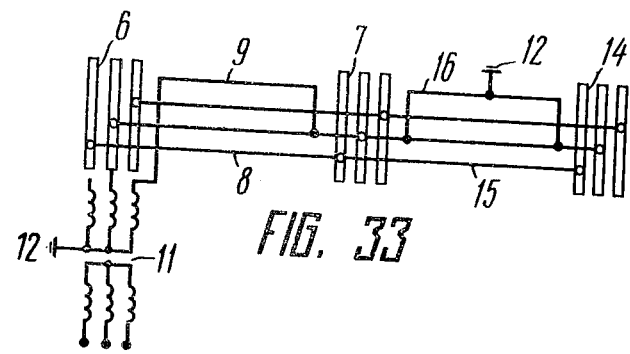
FIG. 33 shows a high-voltage network comprising a three-phase source for melting the ice, with a grounded neutral conductor and two operating outputs, and an additional line, the insulated conductor of which being coupled in parallel with a disconnected phase of the additional line and being grounded between the receiving substations of the main and additional lines.
Figure 34:
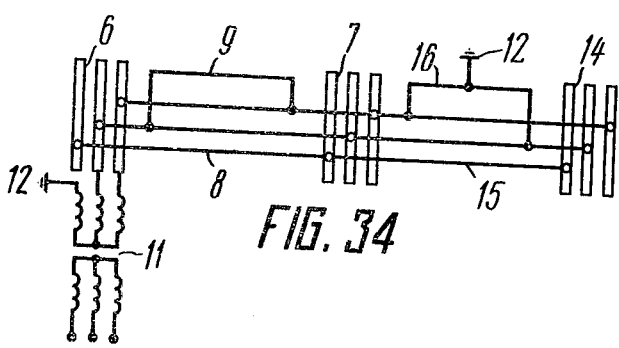
FIG. 34 shows a high-voltage network comprising a three-phase source for melting the ice with an insulated neutral conductor, one grounded output and two operating outputs and an additional overhead line, the insulated conductor of which being coupled by one end to one phase of the main line and by the other end to a disconnected phase of the additional line, which is connected in series with a phase of the main line, said conductor being grounded between the receiving substations of the main and additional lines.
Figure 35:
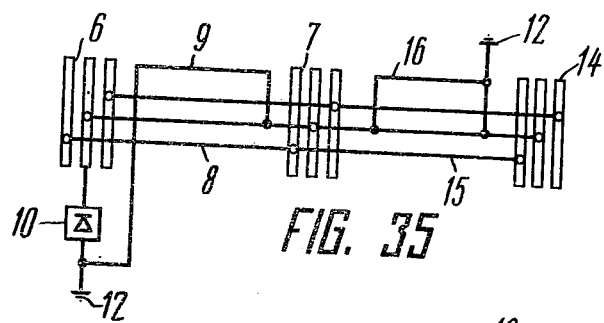
FIG. 35 shows a high-voltage network comprising a DC source for melting the ice with a grounded output and an additional overhead line, the insulated conductor of which being coupled in parallel with a disconnected phase of the additional line and grounded at the substation of the additional line.
Figure 36:
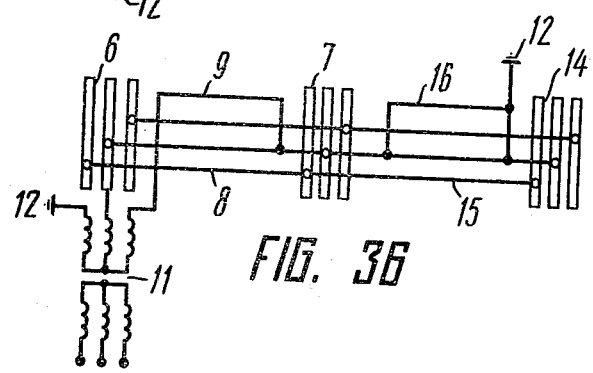
FIG. 36 shows a high-voltage network comprising a three-phase source for melting the ice with an insulated neutral conductor, one grounded output and two operating outputs and an additional line, the insulated conductor of which being coupled in parallel with a disconnected phase of the additional line and grounded at the substation of the additional line.
Figure 37:
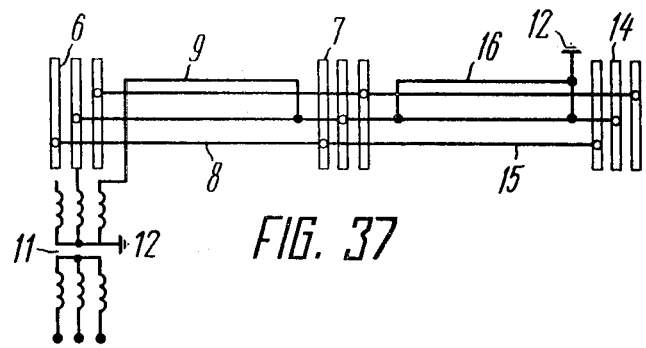
FIG. 37 shows a high-voltage network comprising a three-phase source for melting the icing with a grounded neutral wire and two operating outputs and an additional overhead line, the insulated conductor of which being coupled in parallel with a disconnected phase of the additional line and being grounded at the substation of the additional line.

Referring to FIGS. 32, 33, 34, the three-phase transformer 11 for melting the ice and the insulated conductor 9 of the main overhead line 8 are connected during the ice melting in circuits corresponding respectively to FIGS. 18, 16, 19, the insulated conductor 16 of the additional overhead power transmission line 15 shown in FIG. 34 being coupled by its ends to two disconnected phases of the additional line 15.

Referring to FIGS. 35, 36, 37, 38, the DC source 10 and the three-phase transformer 11 for melting the ice and the insulated conductor 9 of the main overhead line 8 are connected during ice melting as in the circuits of FIGS. 17, 18, 16, 19 respectively.

Figure 39:
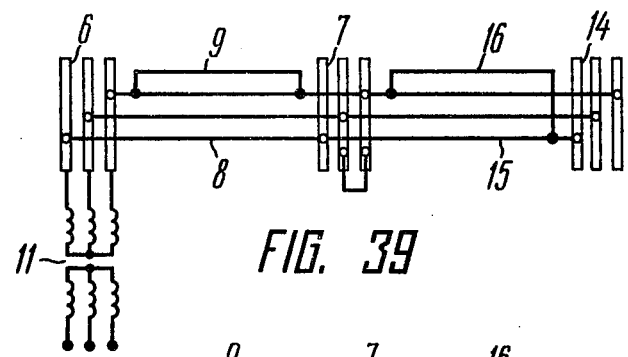
FIG. 39 shows a high-voltage network comprising a three-phase source for melting the icing with an insulated neutral conductor and operating three outputs and an additional overhead line, the insulated conductor of which being coupled by one end to two shorted out phases of the main line at the receiving substation and by the other end to a disconnected phase of the additional line.

The high-voltage network of FIG. 39 comprises the three-phase transformer 11 for melting the ice, the main overhead power transmission line 8 with the insulated conductor 9 and the additional power transmission line 15 with the insulated conductor 16. A disconnected phase of the additional line 15 has one end coupled during ice melting to a disconnected phase of the main power transmission line 8 and the other end coupled to the end of the insulated conductor 16 at the receiving substation of the additional power transmission line 15. The other end of the insulated conductor 16 of said line 15 is connected to two phases of the main line 8, which are shorted out at the receiving substation of the main power transmission line 8.

Figure 40:
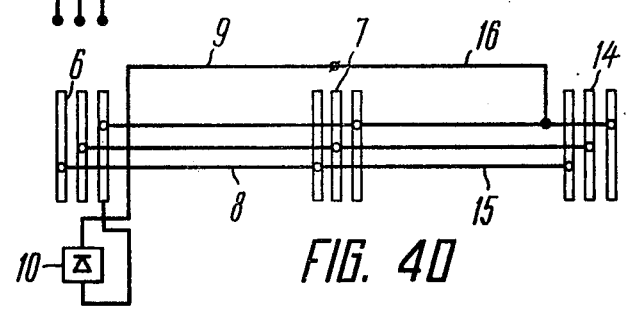
FIG. 40 shows a high-voltage network comprising a DC source for melting the icing and an additional overhead line, the insulated conductor of which being coupled by one end to one output of the source through the conductor of the main line and being coupled by the other end to the second output of the source through the series-connected isolated phases of the main and additional lines.

Referring to FIG. 40, a high-voltage network comprises one additional power transmission line 15 leading from the busbars 7 of the receiving substation of the main power transmission line 8 and provided with the insulated conductor 16. The insulated conductor 9 of the main power transmission line 8 is coupled during ice melting to at least one disconnected phase through the additional line 15 and its insulated conductor 16.

FIGS. 41–49 illustrate embodiments of a high-voltage network comprising another overhead power transmission line leading from sectionalized busbars 14 of the receiving substation of the additional line 15 and provided with an insulated conductor 17, one end of which is connected to the ground 12 and the other end of which is coupled during ice melting to at least one disconnected phase of the other additional line leading from the sectionalized busbars 14 of the receiving substation.

Figure 41:
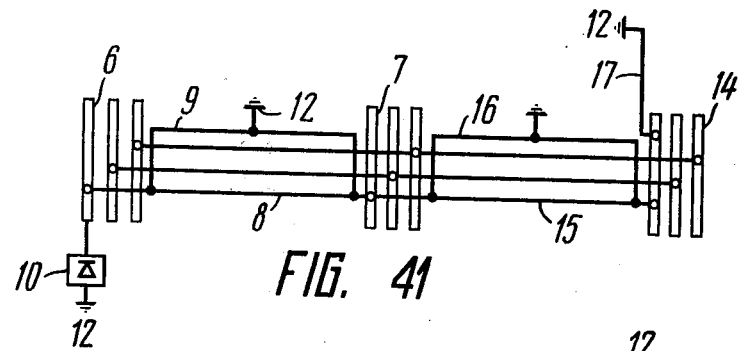
FIG. 41 shows a high-voltage network comprising a DC source for melting the ice with one grounded output, wherein the insulated conductor of the additional line leading from the busbars of the substation of the additional line is coupled to a disconnected phase of the additional line and is grounded from the other end.

Referring to FIG. 41, the DC source 10 for melting the ice and the insulated conductors 9 and 16 are connected during ice melting as in the circuit of FIG. 21.

Figure 22:
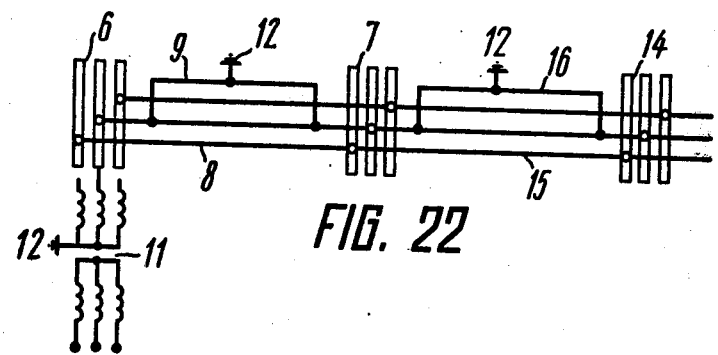
FIG. 22 shows a high-voltage network, wherein one phase of the three-phase AC source for melting the ice with a grounded neutral conductor is used and the insulated conductor of the additional overhead line is connected parallel to a disconnected phase of the additional overhead line and grounded between the receiving substations of the main and additional lines.
Figure 24:
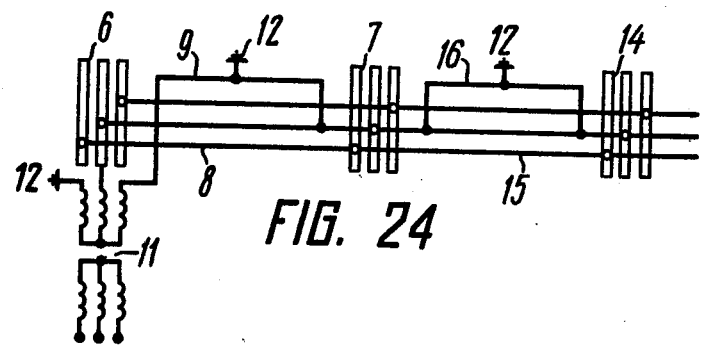
FIG. 24 shows a high-voltage network wherein two phases of the three-phase AC source for melting the ice are used and the third phase is grounded, the insulated conductor of the additional overhead line being coupled parallel to a disconnected phase of the additional line and being grounded between the receiving substations of the main and additional lines.
Figure 25:
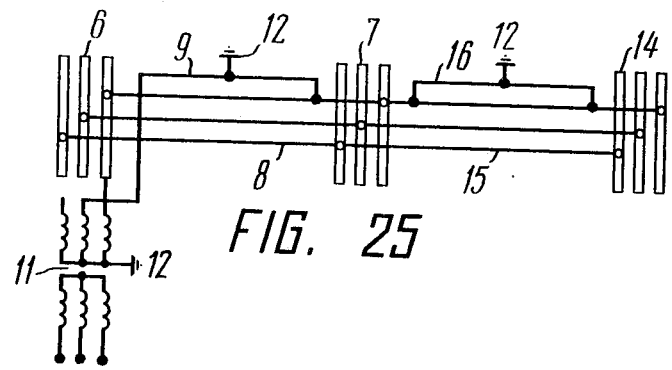
FIG. 25 shows a high voltage network comprising a three-phase source for melting the ice with a grounded neutral conductor and an insulated conductor of the additional overhead line connected parallel to a disconnected phase of the additional line and grounded between the receiving substations of the main and additional lines.
Figure 26:
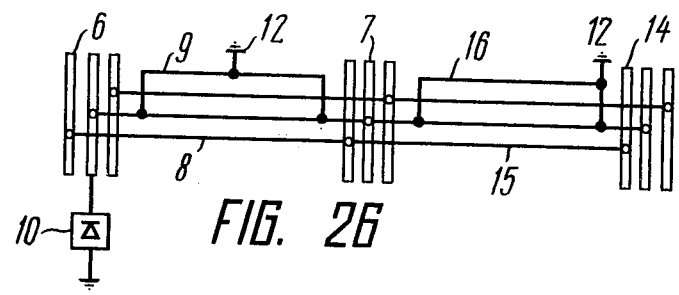
FIG. 26 shows a high-voltage network comprising a DC source for melting the ice with a grounded output and an insulated conductor of the additional overhead line coupled parallel to a disconnected additional line and grounded at the receiving substation of the additional line.
Figure 27:
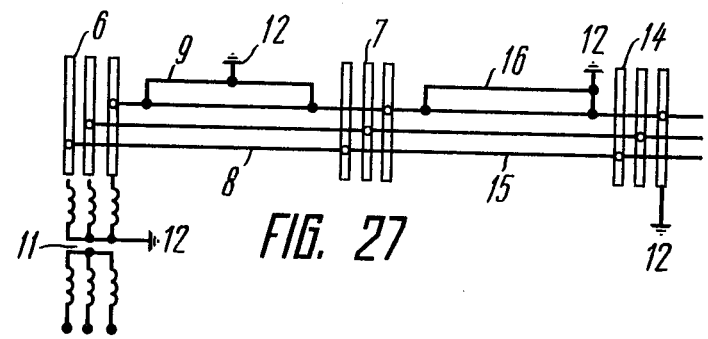
FIG. 27 shows a high-voltage network comprising a three-phase source for melting the ice with a grounded neutral conductor and an insulated conductor of the additional overhead line coupled parallel to a disconnected phase of the additional line and grounded at the receiving substation of the additional line.
Figure 28:
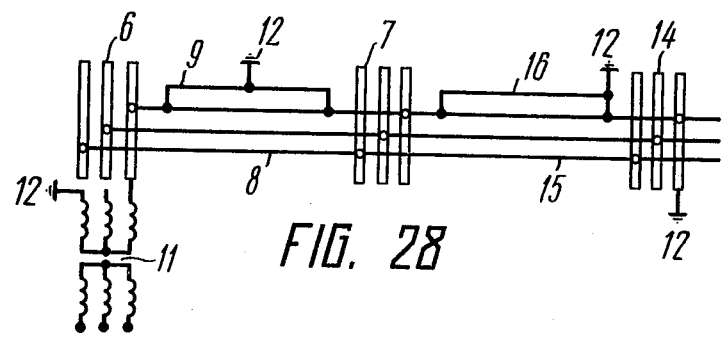
FIGS. 28 and 29 show embodiments of a high-voltage network comprising a three-phase source for melting the ice, with an insulated neutral conductor and one grounded output, and an insulated conductor of the additional overhead line coupled parallel to a disconnected phase of the additional line and grounded at the receiving substation of the additional line.
Figure 42:
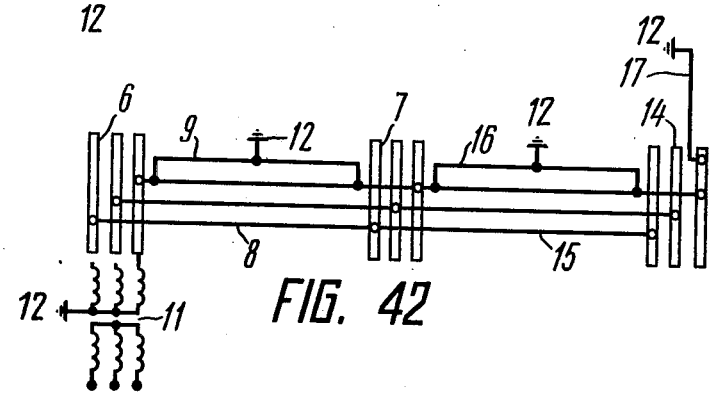
FIG. 42 shows a high-voltage network comprising a three-phase source for melting the ice with a grounded neutral conductor and one operating output, wherein the conductor of the additional line leading from the busbars of the substation of the additional line is coupled to a disconnected phase of the additional line and grounded at the other end.
Figure 43:
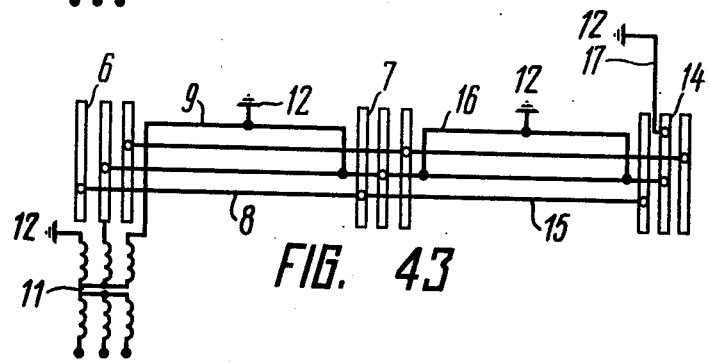
FIG. 43 shows a high-voltage network comprising a three-phase source for melting the ice with one grounded output and two other operating outputs, wherein the insulated conductor of the additional line leading from the busbars of the substation of the additional line is coupled to a disconnected phase of the additional line and grounded at the other end.
Figure 44:
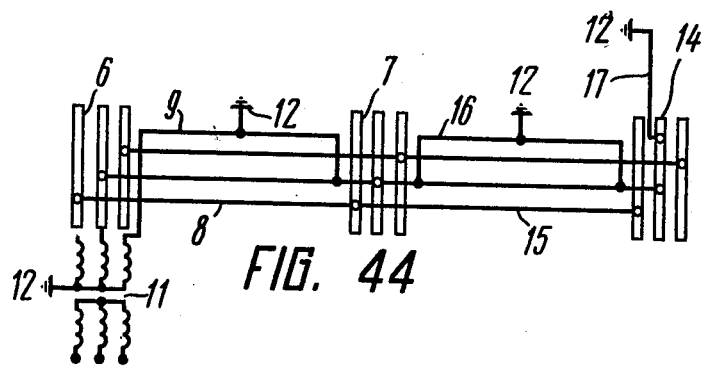
FIG. 44 shows a high-voltage network comprising a three-phase source for melting the ice with a grounded neutral conductor and two operating outputs, wherein the insulated conductor of the additional line leading from the busbars of the substation of the additional line is coupled to a disconnected phase of the additional line and grounded at the other end.

Referring to FIGS. 42, 43, 44, the three-phase transformer 11 for melting the ice and the insulated conductors 9 and 16 are connected during ice melting as in the circuits of FIGS. 22, 24 and 25 respectively.

Figure 45:
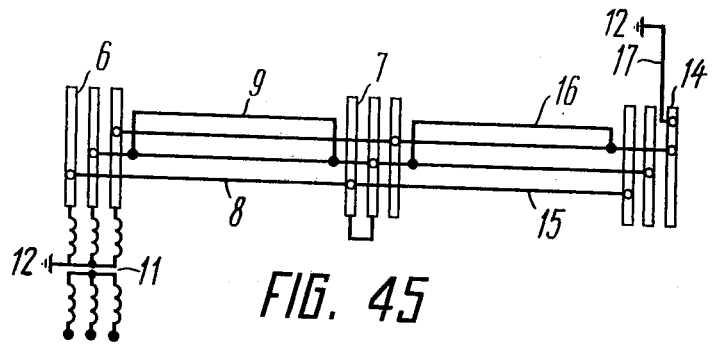
FIG. 45 shows a high-voltage network comprising a three-phase source for melting the ice with a grounded neutral conductor and three operating outputs, wherein the insulated conductor of the additional line leading from the busbars of the substations of the additional line is coupled to a disconnected phase of the additional line and grounded at the other end.
Figure 46:
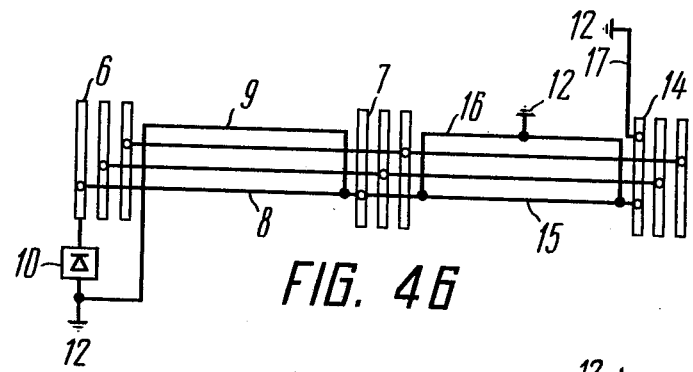
FIG. 46 shows a high-voltage network comprising a DC source with one grounded output, wherein the insulated conductor of the additional line leading from the busbars of the substation of the additional line is coupled to a disconnected phase of the additional line and grounded at the other end.
Figure 47:
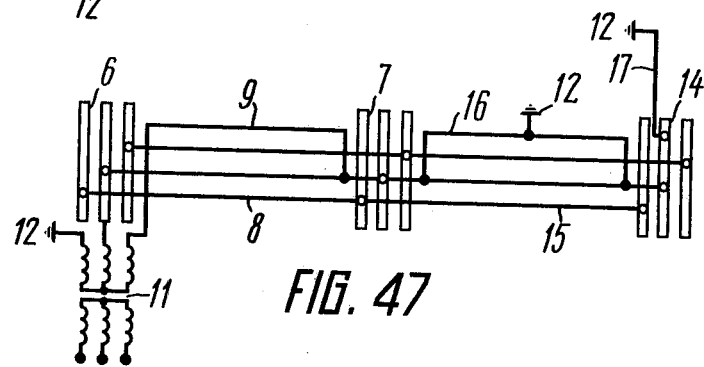
FIG. 47 shows a high-voltage network comprising a three-phase source for melting the ice with one grounded output and two other operating outputs, wherein the insulated conductor of the additional line leading from the busbars of the substation of the additional line is coupled to a disconnected phase of the additional line and grounded at the other end.
Figure 48:
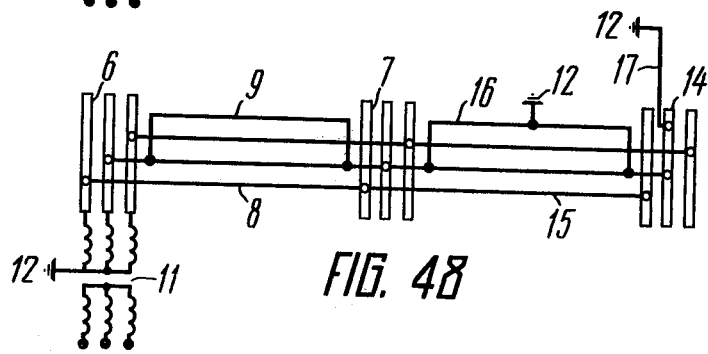
FIG. 48 shows a high-voltage network comprising a three-phase source for melting the ice with a grounded neutral conductor and three operating outputs, wherein the insulated conductor of the additional line leading from the busbars of the substation of the additional line is coupled to a disconnected phase of said line and grounded at the other end.
Figure 49:
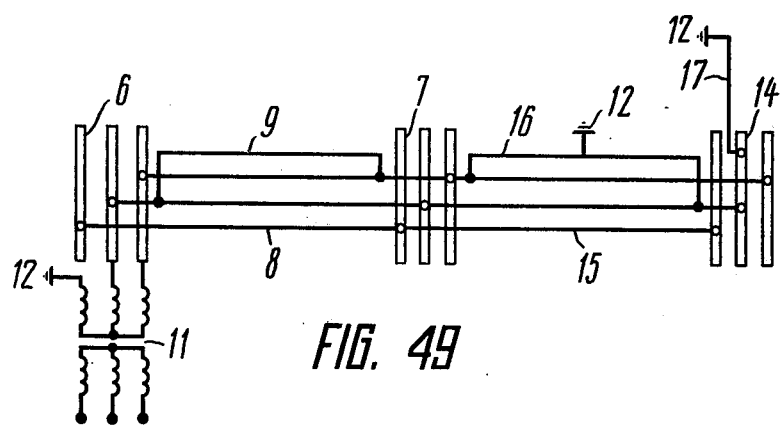
FIG. 49 shows a high-voltage network comprising a three-phase source for melting the ice with one grounded output and two other operating outputs, wherein the insulated conductor of the additional line leading from the busbars of the substation of the additional line is coupled to a disconnected phase of the additional line and grounded at the other end.

The embodiment of FIG. 45 uses the three-phase transformer 11 with the neutral conductor connected to the ground 12 and the three operating outputs connected to the busbars 6 of the transmitting substation of the main power transmission line 8, two busbars 7 of the receiving substations, which are connected to the ends of the insulated conductors 9 and 16, being shorted out.

Referring to FIGS. 46, 47, 48 and 49, the DC source 10 for melting the ice, the three-phase transformer 11 and the insulated conductors 9 and 16 are connected during ice melting as in circuits similar to those of FIGS. 35, 36, 33 and 34, respectively.

Figure 50:
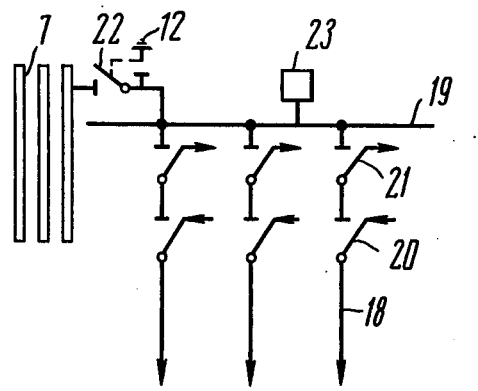
FIG. 50 shows a device for automatic connection of the network circuit for melting the ice on conductors of overhead lines.

To effect automatic connection of the circuit for melting the ice, a circuit shown in FIG. 50 is used in the proposed high-voltage network, wherein insulated conductors 18 of the overhead line are connected to a sectionalized busbar 19 to melt the ice on said conductors 18 through a series-connected short-circuiter 20 and a separator 21.

The sectionalized busbar 19 is connected to the sectionalized busbars 7 of the transmitting substation through a disconnector 22. The sectionalized busbars 7 are coupled to the conductors of a disconnected power transmission line both during ice melting and in normal operation of the network.

To register the presence or absence of a specified voltage the busbar 19 is joined to a voltage sensor 23 which controls the short circuiters 20 and separators 21.

The insulated conductor 9 is heated in the high-voltage network of FIG. 1 by the passage of current in the following circuit: one output of the DC source 10 — the beginning of the heated conductor 9 — the conductor 9 — the end of the conductor 9 coupled to a disconnected phase of the line 8 at the receiving substation — conductor of the disconnected phase of the line 8 — the phase of the sectionalized busbars 6 of the source 10. In this case the degree of insulation of the conductor 9, as compared to that used in the known method of melting the ice on conductors by the circuit "source for melting the ice - conductor - ground", is reduced by one half, because the total voltage of the source 10 is applied to two insulators (not shown) which are connected in series through the ground at the beginning and at the end of the conductor.

The conductor 9 is heated in the circuit of FIG. 2 in a manner similar to that of FIG. 1, the source for melting the ice being the three-phase transformer 11.

In the high-voltage network which comprises the overhead line 8, provided with the insulated conductor and connecting the busbars 6 and 7 of the transmitting and receiving substations, and a source for melting the ice, the conductor with a lower insulation level can be heated with the circuits of FIGS. 3, 4 and 5.

The portion of the conductor 9 is heated by the circuits of FIGS. 3, 4, 5 by means of passing the current as follows: the output of the source 10 or the three-phase transformer 11, which is coupled to a disconnected phase of the sectionalized busbars 6 — the disconnected phase of the line 8 — the beginning of the portion of the conductor 9 connected to a phase of the line 8 at the transmitting substation 13 a portion of the conductor 9 — the ground 12 of the conductor 9 — the ground circuit of the supply substation — the second output of the source 10 or the three-phase transformer 11.

The portion of the conductor 9 between the ground 12 and the busbars 7 of the receiving substation is heated similarly to the portion of said conductor 9 between the transmitting substation and the ground 12 of the conductor 9. The voltage of the source for melting the ice is applied between the ends of the conductor 9 and the ground 12, that is the total voltage for the DC source 10 according to the circuit of FIG. 3, the phase voltage according to the circuit of FIG. 4 and the line voltage according to the circuit of FIG. 5. With the known methods for melting the ice on the conductors 9, the degree of insulation of conductors and, respectively, the voltage of the ice melting source should be twice that of the circuits of FIGS. 3, 4 and 5 connected in accordance with the invention.

The conductor 9 is heated according to the circuit of FIG. 6 by passing the current as follows:

(a) for the portion of the conductor 9 between the transmitting substation and the ground 12 of the conductor 9: one output of a phase of the source 11 — of the portion of the conductor 9 — the ground 12 of the conductor 9 — the ground 12 of the transmitting substation — the second output of the phase of the source 11; and (b) for the portion of the conductor 9 between the receiving substation and the ground 12 of the conductor 9: the third output of a phase of the transformer 11 — a phase of sectionalized busbars 6 — a disconnected phase of the line 8 — the portion of the conductor 9 — the ground 12 of the conductor 9 — the ground 12 of the transmitting substation — the second output of the phase of the transformer 11. The current flows along circuits by the action of the line voltage of the transformer 11.

The conductor 9 is heated by the circuits of FIGS. 7, 8, 9, 11 by passing the current as follows: one output of the source 10 or the transformer 11 — a phase of the busbars 6 — the conductor 9 — a phase of the line 8 — the second output of the source 10 or the transformer 11. Such method of melting the ice can be employed concurrently with ice melting on the conductors of the line 8 effected in a "conductor-conductor" circuit (FIGS. 7, 8) or a "conductor-two conductors" circuit (FIG. 9) or a "three conductors" circuit (FIG. 11). The current flows along the conductor 9 by the action of the voltage drop in the conductor of the line 8.

The conductor 9 is heated by the circuit of FIG. 10 similarly to the circuit of FIG. 6, wherein the three-phase transformer 11 with a grounded neutral conductor is used as a source for melting the ice. The current passes by the action of the phase voltage of the transformer 11 along the following circuit: a phase of the source 11 — a portion of the conductor 9 — the ground 12 of the conductor 9 — the ground 12 of the neutral conductor of the source 11 — and a phase of the source 11 — a disconnected phase of the line 8 — a portion of the conductor 9 — the ground 12 of the conductor 9 — the ground 12 of the neutral conductor of the source 11.

The conductor 13 is heated by the circuits of FIGS. 12–20 by passing the current along the following circuit: one output of the source 10 or the three-phase transformer 11 — a phase of the busbars 6 — a disconnected phase of the line 8 — the conductor 13 of the additional line leading from the busbars 7 of the receiving substation — the ground 12 of the conductor 13 — the grounding 12 of the source 10 or the transformer 11. The conductors 13 of the lines leading from the receiving substation are heated along the circuit where the ground is used as a connecting return conductor. In this connection there is provided a tie of the potential of the source 10 for melting the ice to the circuit of the ground 12. When the transformer 11 with an insulated neutral conductor is used as a source for melting the ice, the tie of the potential is effected by connecting one of its phases to the ground 12.

In a high-voltage network comprising, apart from the transmitting and receiving substations with an overhead line therebetween, one more additional line with an additional receiving substation, the conductor of this additional line can be heated by the circuits shown in FIGS. 21-33, as well as the circuits shown in FIGS. 39 and 40. The conductors of the main line and the additional line leading from the busbars of the receiving substation can be heated together with the conductors of the line between the main and additional receiving substations.

Portions of the conductor 16 grounded on the conductor of the additional line 15 are heated by the circuits of FIGS. 21-25, 31-33 by passing the current as follows:

(a) for the portions of the conductor 16 between the busbars 7 of the receiving substation and the ground 12 of the conductor 16: one output of the source 10 for melting the icing or the transformer 11 — a disconnected phase of the main line 8 — a phase of the busbars 7 of the receiving substation — a portion of the conductor 16 — the ground 12 of the conductor 16 — the ground 12 of the source 10 or the transformer 11 for ice melting; and (b) for the portion of the conductor 16 between the busbars 14 of the additional line 15 and the ground 12 of the conductor 16: one output of the source 10 for melting the icing or the transformer 11 — a disconnected phase of the main line 8 — a phase of the busbars 7 — a disconnected phase of the additional line 16 — a portion of the conductor 16 — the ground 12 of the conductor 16 — the grounding 12 of the source 10 or the transformer 11.

Figure 23:
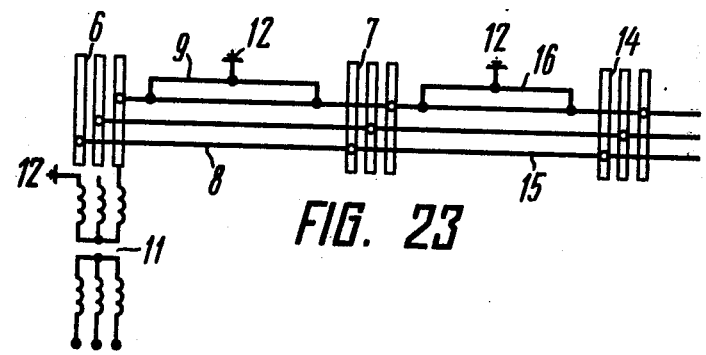
FIG. 23 shows a high-voltage network wherein one phase of the three-phase AC source for melting the ice is used and another phase is grounded, the insulated conductor of the additional overhead line being coupled parallel to a disconnected phase of the additional overhead line and being grounded between the receiving substations of the main and additional lines.
Figure 29:
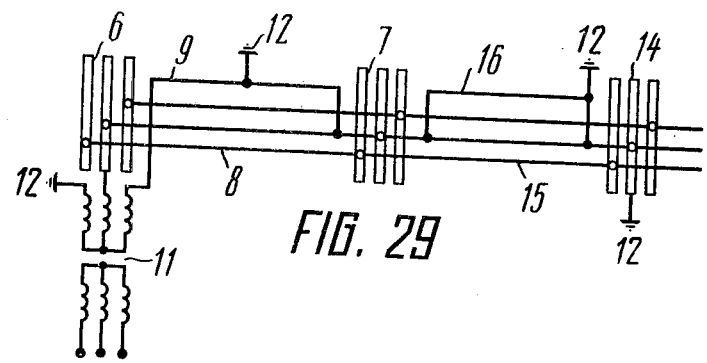
Figure 30:
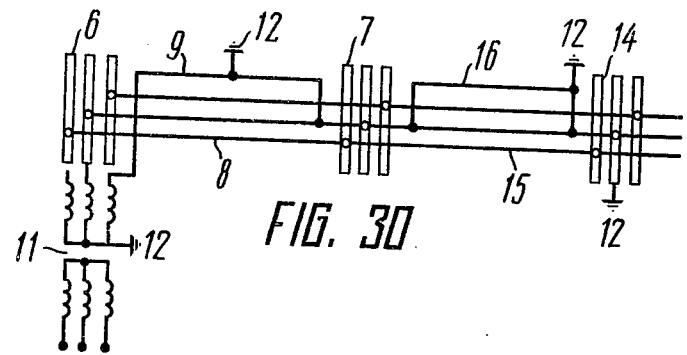
FIG. 30 shows a high-voltage network comprising a three-phase source for melting the ice, with a grounded neutral conductor and two operating outputs, and an additional overhead line, the insulated conductor being coupled parallel to a disconnected phase of the additional line and being grounded at the receiving substation of the additional line.
Figure 38:
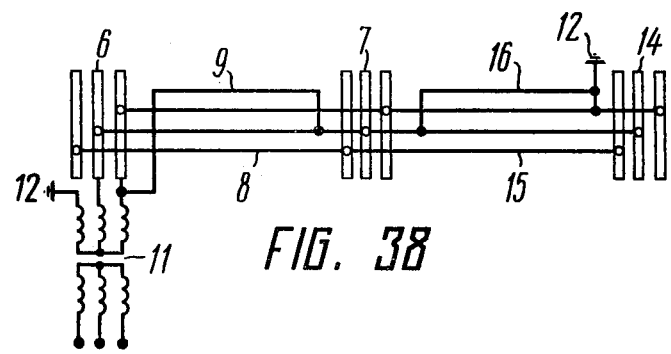
FIG. 38 shows a high-voltage network comprising a three-phase source for melting the icing with one grounded output and two other operating outputs and an additional overhead line, the insulated conductor of which being coupled in parallel with a disconnected phase of the additional line and being grounded at the substation of the additional line.

The conductor 16 of the additional line 15 is heated by circuit shown in FIGS. 34, 38 by passing the current under the effect of the line voltage similarly to the circuit shown in FIGS. 23 and 29, respectively.

The conductor 16 grounded at the receiving substation of the additional line 15 is heated by the circuits of FIGS. 26-30, 35-38 by passing the current through the conductor 16 under the effect of the voltage drop at the disconnected phase of the line 15. This method of melting the ice on the conductors 16 is convenient to employ when concurrently melting the ice on the disconnected conductors of the lines 8 and 15 according to the circuit "conductor-ground".

The conductor 16 of the additional line 15 is heated by the circuit shown in FIG. 39 by passing the current under the effect of the line voltage of the transformer 11 as follows: a phase of the transformer 11 — disconnected phases of the lines 8 and 15, which are connected is series on the busbars 7 of the receiving substation — the conductor 16 of the line 15 — the busbars 7 of the receiving substation — phases of the line 8 shorted out at the receiving substation — outputs of the transformer 11.

The conductor 16 of the additional line 15 is heated according to the circuit shown in FIG. 40 by passing the current under the effect of the full voltage of the source 10 for melting the ice as follows: the output of the source 10 — a disconnected phase of the line 8 — a phase of the busbars 7 — a phase of the line 15 — the conductors 16 — the conductor 9 — another output of the source 10.

The conductor 17 of the additional line leading from the busbars 14 of the receiving substation is heated by to the circuits shown in FIGS. 41-49 similarly to the circuits shown in FIGS. 12-20, respectively.

It is important that the conductors of the network are automatically connected to a disconnected conductor of the line if there is no duty personnel at a substation.

Automatic connection of the conductor to the busbars to melt the ice thereon is done as follows: the disconnector 22 (FIG. 50) is switched on in advance of the ice season. When the voltage for melting the icing, which is different from the operational voltage, is supplied, the sensor 23 feeds a pulse to switch on the short circuiters 20; normally the separators 21 are closed. When the process of melting is completed, the voltage is no longer supplied and the sensor 23 gives the command to switch off the separators 21. Reestablishment of the circuit is done manually or by remote control.

The sensor 23 does not respond to the value of the operational voltage since the voltage for melting is lower.

This invention permits melting of ice on conductors of power transmission lines leading from distribution substations by means of one source.

Besides, considerable reduction of the degree of insulation of the conductor is achieved by dividing the conductor into a number of portions and supplying each such portion with a voltage sufficient for heating the conductor by means of disconnected conductors of the power transmission line.

The value of the voltage required for melting the ice on the conductor and, consequently, the degree of the conductor-insulation are reduced in direct proportion to the ratio between the length of a separated portion of the conductor and its total length.

What is claimed is:

1. A high-voltage network comprising: a transmitting substation; a receiving substation; an overhead power transmission line connecting busbars of the transmitting and receiving substations; a source for melting ice on said overhead power transmission line joined, during ice melting, to at least one disconnected phase of said overhead power transmission line; and an insulated conductor joined, during ice melting, to at least one disconnected phase of said overhead power transmission line from its opposite ends.

2. A high-voltage network as claimed in claim 1, wherein said overhead power transmission line with said insulated conductor connects said busbars of said transmitting and receiving substations; said source for melting the ice having one output connected, during ice melting, to one end of said insulated conductor and another output of said source for melting the ice and the other end of said insulated conductor being connected from the opposite ends of said overhead power transmission line to at least one disconnected phase of said overhead power transmission line.

3. A high-voltage network as claimed in claim 1, wherein said overhead power transmission line with said insulated conductor connects said busbars of the transmitting and receiving substations; said source for melting the ice, having one output which is connected during ice melting to one end of said insulated conductor and another output of said source for melting the ice being grounded, said output of said source for melting the ice being connected to one end of said insulated conductor and the other end of said insulated conductor being connected from the opposite ends of said overhead power transmission line to at least one disconnected phase of said overhead power transmission line, said insulated conductor being grounded between said transmitting and receiving substations.

4. A high-voltage network as claimed in claim 2, comprising a three-phase transformer as said source for melting the ice, one output of which is connected to one end of said insulated conductor and another output of said three-phase transformer is grounded, said insulated conductor being grounded between said transmitting and receiving substations.

5. A high-voltage network as claimed in claim 2, wherein at least one other phase of said overhead power transmission line is connected in parallel with said insulated conductor during ice melting.

6. A high-voltage network as claimed in claim 2, comprising a three-phase transformer as said source for melting the ice, one output of which is connected to one end of said insulated conductor; a neutral wire of said three-phase transformer connected to a grounding circuit, the insulated conductor being grounded between said transmitting and receiving substations.

7. A high-voltage network as claimed in claim 2, comprising a three-phase transformer as said source for melting the ice and having three operating outputs, said outputs of said three-phase transformer being connected at one end to different phases of said overhead power transmission line, these phases being grounded at the other end.

8. A high-voltage network comprising: a transmitting substation; a receiving substation; a main overhead power transmission line connecting busbars of said transmitting and receiving substations; a source for melting ice which forms on said overhead power transmission line joined, during ice melting, to at least one disconnected phase of said main overhead power transmission line; an insulated conductor connected, during ice melting, to at least one disconnected phase of said main overhead power transmission line from its opposite ends; an additional overhead power transmission line leading from busbars of said receiving substation; and an insulated conductor of said additional overhead power transmission line, one end of which is grounded and an other end of said insulated conductor is joined, during ice melting, to at least one disconnected phase of said additional overhead power transmission line.

9. A high-voltage network as claimed in claim 8, wherein said additional overhead power transmission line leads from said busbars of said receiving substation of said main overhead power transmission line; an insulated conductor of said additional overhead power transmission line one end of which is grounded and another end of which is connected to at least one disconnected phase of said main overhead power transmission line, one end of said source for melting the ice being grounded.

10. A high-voltage network as claimed in claim 8, comprising a three-phase transformer as said source for melting the ice, two outputs of which are joined, during ice melting, to an end of said insulated conductor of said main overhead power transmission line and a third output of said three-phase transformer being grounded, said additional overhead power transmission line leading from said busbars of said receiving substation, said insulated conductor of said additional overhead power transmission line having one end grounded and another end of connected, during ice melting, to at least one disconnected phase of said main overhead power transmission line.

11. A high-voltage network as claimed in claim 8, comprising a three-phase transformer two outputs of which are connected, during ice melting, to two phases of said main overhead power transmission line coupled to the ends of said insulated conductor of said main overhead power transmission line with a neutral wire grounded; an additional overhead power transmission line leading from said busbars of said receiving substation; an insulated conductor of said additional overhead power transmission line one end of which is grounded and another end of which is connected, during ice melting, to at least one disconnected phase of said main overhead power transmission line.

12. A high-voltage network as claimed in claim 8, comprising a three-phase transformer as said source for melting the ice, two outputs of which are connected, during ice melting, to two phases of said main overhead power transmission line, to which said ends of said insulated conductor of said main overhead power transmission line are connected, said additional overhead power transmission line leading from said busbars of said receiving substation; an insulated conductor of said additional overhead power transmission line, one end of which is grounded and another end of said insulated conductor is connected, during ice melting, to at least one disconnected phase of said main overhead power transmission line, a third output of said three-phase transformer being connected to the grounding circuit.

13. A high-voltage network comprising: a transmitting substation; receiving substations; a main overhead power transmission line connecting busbars of said transmitting and receiving substations; a source for melting ice which forms on said overhead power transmission line connected, during ice melting, to at least one disconnected phase of said main overhead power transmission line; an insulated conductor connected, during ice melting, to at least one disconnected phase of said main overhead power transmission line at opposite ends thereof; an additional overhead power transmission line leading from said busbars of said receiving substations of said main overhead power transmission line; an insulated conductor of said additional overhead power transmission line, ends of which are connected, during ice melting, to one disconnected phase of said additional overhead power transmission line, said insulated conductor of said additional power transmission line being grounded between said receiving substations of said main and additional overhead power transmission lines or at said receiving substation of said additional overhead power transmission line.

14. A high-voltage network as claimed in claim 1, comprising a three-phase transformer as said source for melting the ice; an additional overhead power transmission line leading from said busbars of said receiving substation of said main overhead power transmission line; an insulated conductor of said additional overhead power transmission line, a disconnected phase of said additional overhead power transmission line being connected at one end to a disconnected phase of said main overhead power transmission line and at another end, at said receiving substation, to an end of said insulated conductor of said additional power transmission line, said other end of said insulated conductor of said additional power transmission line being connected to two phases of said main overhead power transmission line shorted out to each other at said receiving substation of said main overhead power transmission line.

15. A high-voltage network as claimed in claim 1, comprising an additional overhead power transmission line leading from said busbars of said receiving substation; an insulated conductor of said additional overhead power transmission line, an insulated conductor of the main overhead power transmission line connected, during ice melting, to at least one disconnected phase via said additional overhead power transmission line and the insulated conductor thereof.

16. A high-voltage network comprising: a transmitting substation; receiving substations; a main overhead power transmission line connecting busbars of said transmitting and receiving substations; a source for melting ice, which forms on said overhead power transmission line, joined, during ice melting, to at least one disconnected phase of said main overhead power transmission line; an insulated conductor connected, during ice melting, to at least one disconnected phase of said main overhead power transmission line at the opposite ends thereof; an additional overhead power transmission line leading from said busbars of said receiving substation of said main overhead power transmission line; an insulated conductor of said additional overhead power transmission line, ends of which are connected, during ice melting, to one disconnected phase of said additional overhead power transmission line; another additional overhead power transmission line leading from the sectionalized busbars of an additional substation; an insulated conductor one end of which is grounded and another end of which is connected, during ice melting, to at least one disconnected phase of another additional overhead line leading from said busbars of said additional substation.

17. A device in a high-voltage network for automatic actuation of a circuit for melting ice which forms on overhead power transmission lines, comprising electrical circuit means composed of a series-connected short circuiter and a separator through which insulated conductors are connected during ice melting to at least one disconnected phase of a power transmission line, and at least one voltage sensor which controls said short circuiters and separators in response to a voltage of a specified value applied to said at least one voltage sensor.

* * * * *